April 18, 1961    B. K. CLIFFORD    2,980,573
VENTILATED HONEYCOMB
Filed May 7, 1959
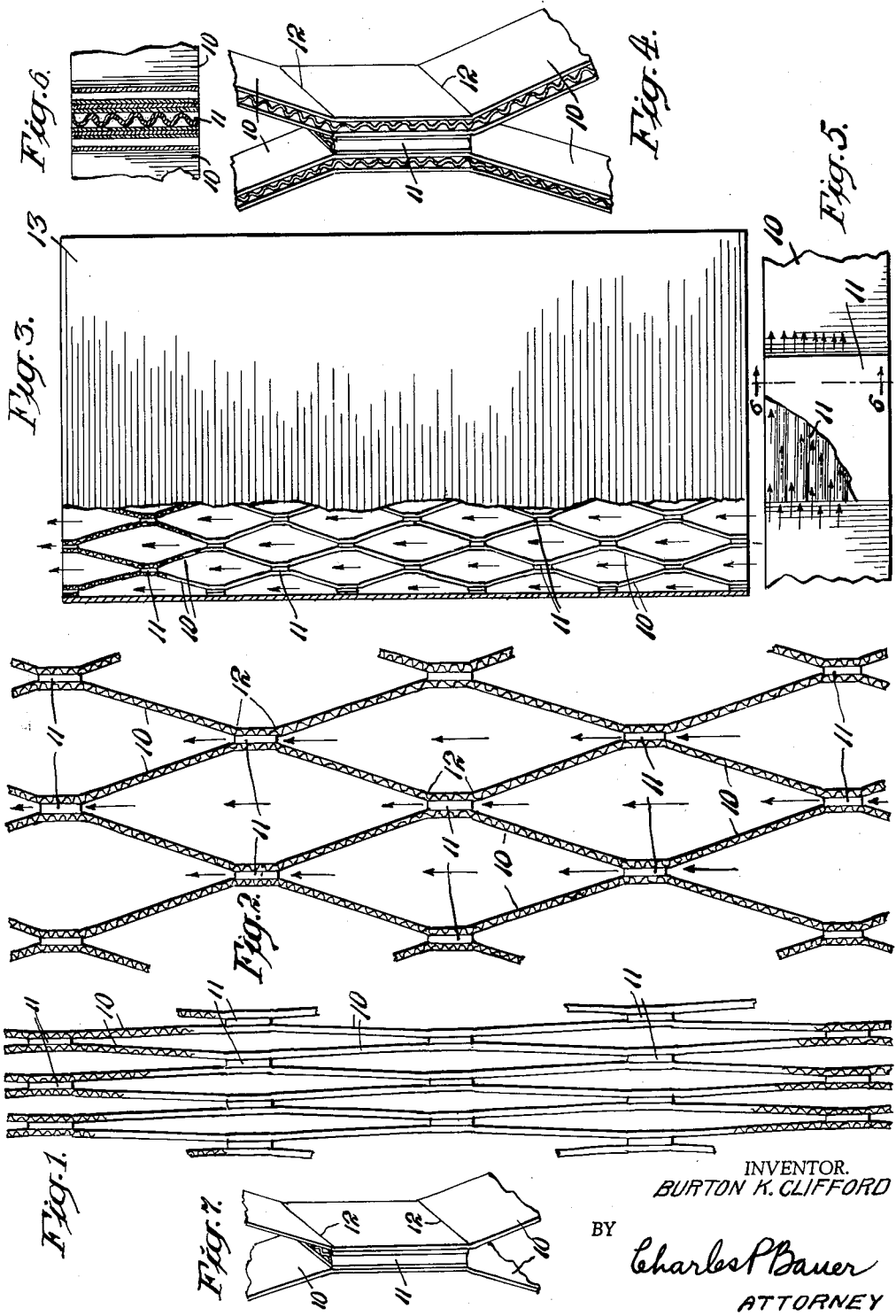
INVENTOR.
BURTON K. CLIFFORD
BY
Charles P Bauer
ATTORNEY

United States Patent Office 2,980,573
Patented Apr. 18, 1961

2,980,573

VENTILATED HONEYCOMB

Burton K. Clifford, Glens Falls, N.Y., assignor to Union Bag-Camp Paper Corporation, New York, N.Y., a corporation of Virginia Filed May 7, 1959, Ser. No. 811,728

6 Claims. (Cl. 154—118)

The present invention relates to improvements in honeycomb material. More particularly, it pertains to a honeycomb core having ventilation between the cells and the method of making such core.

In forming structural panels with honeycomb core material the faces of sheet material are bonded to the cells under heat and pressure. This creates vapors and gases within the cells which should be dissipated to insure a strong and proper bond between the faces and the cells. It is an object of the present invention to provide a honeycomb core constructed so that there is venting between the cells and out of the structure.

A further object is to provide a honeycomb core in which the cells are interconnected by spacing strips which not only afford ventilation between the cells but also give wider and better bonding areas for the faces.

A further object is to provide a honeycomb core in which the interspaced strips facilitate the expansion of the core.

A further object is to provide a honeycomb core which is simple in design and effective for its intended purpose.

It is a further object to provide a method for making the core described in a simple and quick operation.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which:

Figure 1 is a top view of a slightly expanded piece of honeycomb core material with ventilated spacers between the sheets;

Figure 2 shows the honeycomb material of Figure 1 in expanded form;

Figure 3 shows the honeycomb material of Figure 2 with a face sheet applied over the cells;

Figure 4 is an enlarged perspective view illustrating the connection of the spacer to the cell walls;

Figure 5 is an enlarged side view of the connection of the spacer to the cell walls showing the passageways between cells;

Figure 6 is a sectional view taken on the line 6—6 of Figure 5;

Figure 7 is a view similar to that of Figure 4 showing a modified form of cell wall.

The "honeycomb structure" or "honeycomb material" referred to in the specification and claims and shown in the drawings is made up of a plurality of open ended cells which may be of any desired size and shape, for example: hexagonal, circular, oval or rectangular. Such structure may be formed of any desired material, for example: paper, cloth, metal or the like or combinations thereof. However, because of ease of fabrication and economy, it has been found preferable to construct the structure of paper or paperboard.

The paper honeycomb structure is usually produced by superimposing sheets of paper upon each other until a thick stack or pad is formed, each sheet of this stack being held to the one above it, by adhesive or other means, along spaced and generally parallel lines, with the lines on one side of each sheet between the lines on the other side of said sheet. The distance between such lines determines the cell size. By cutting this stack at a right angle across the lines holding the sheet together, pieces may be obtained of a length corresponding to the desired thickness of the honeycomb core material. The thickness of the pad may be varied and is dependent upon several factors, such as size, weight, and the use to which it will be put. These pieces are then expanded into the shape and form shown in Figures 2 and 3. It will be understood that the cell wall thickness depends on the weight or thickness of the paper or sheets used. Since the honeycomb structure varies with both the cell wall thickness and cell size, these may be varied to meet practically any requirements. Where additional rigidity or strength is required or where the material is used in places where it will be subjected to high humidity or moisture, which softens and weakens the paper, the paper may be impregnated or coated with resin, sulphur, metal or similar products. This may be done prior to the forming of the paper into the honeycomb structure or after. Where the honeycomb structure is to be made of other materials, for example, cloth or metal, other known methods may be used to construct the desired structure.

In the present invention the honeycomb material is formed by a different method which results in a honeycomb structure which has the improved qualities referred to above. Referring more particularly to the drawing there is shown in Figure 1 a pad which is slightly expanded to show the structure more clearly. This pad is produced by superimposing sheets 10 of corrugated board upon each other until a thick stack is formed. The flutes of all the sheets should be run in one direction as will be explained hereinafter. Interposed between the sheets are strips 11 of corrugated board which strips are spaced from each other along generally parallel lines, with the strips on one side of each sheet between the strips on the other side of said sheet. These strips are adhesively secured to the sheets with the flutes running at right angles to the flutes of the sheets. The width of the strips and spacing thereof will determine the size and shape of the cells of the expanded material.

By cutting the stack of sheets and strips at right angles across the strips, pieces or slices may be obtained of a length corresponding to the desired thickness of the honeycomb structure to be faced as shown in Figures 4 and 5. These pieces are then expanded into the shape and form shown in Figures 2 and 3. It will be noted that the flutes of the sheets making up the walls of the cells illustrated run in the same direction as the cells, thus giving compression strength where it is most needed. However, this condition only arises where the sheets forming the cell walls are made of corrugated board. It should be understood that such walls may also be of pulpboard, kraft-board, fibreboard or paper (Figure 7) or of the structural materials mentioned above, for example, cloth, metal or the like. Likewise, the interspaced strips shown are made of corrugated board, primarily because such board is made up of a series of passageways which provide the ventilation desired. Here, again it is possible to substitute other cellular materials having the necessary passageways. In any event the flutes or cells of the spacers must run at right angles to the direction of the cells so that gases, vapor or air may pass from one cell to the next and eventually out of the honeycomb panel.

In addition to providing ventilation the interspaced strips also serve other purposes. The corrugated board or other similar cellular material with the flutes or cells at right angles to the cells furnish a wide glue line and therefore form a good bond for the facing sheet at each juncture of the walls. These wide juncture areas also have a softness which tends to prevent show-through when pressing the faces of the panels against the cells. Furthermore, the edges of the strips act as lines along which the walls in effect break when the honeycomb slice is expanded. This causes the slice to open up automatically and readily without any slitting or relief cutting. The lines described are shown as 12 in Figures 4 and 7.

The honeycomb core of the present invention is faced, as illustrated in Figure 3, with any desired and suitable sheet material. Such facing sheets are applied with adhesive under pressure, and in many cases under heat and pressure. The air, vapors and gases within the cells can be dissipated from the structure through the cells of the interspaced strips as shown by the arrows in Figures 2, 3 and 5.

Thus it will be apparent that the herein disclosed invention provides a new and useful honeycomb core material and an improved method of making it. Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A honeycomb core material for use in a structural panel having face sheets separated by a core comprising a plurality of paper strips, a plurality of spacers, said strips having spacers adhesively bonded thereto at spaced intervals with intervening areas separated to form a plurality of cells, the spacers on one side of each strip being positioned between the spacers on the other side of said strip, said spacers being formed of corrugated board and thereby having passageways extending between the cells for liberating gases and vapors from within each cell and from within the structural panel.

2. The material of claim 1 in which the paper strips are formed of corrugated board with the flutes running in the direction of the cells and in which the spacers are formed of corrugated board with the flutes running at right angles to the direction of the cells to serve as said passageways.

3. A honeycomb material comprising a plurality of cells walls, a plurality of spacers, said walls having spacers bonded thereto at spaced intervals with intervening areas separated to form a plurality of cells, said spacers being formed of corrugated board and thereby having passageways running between the cells for dissipating gases and vapor from within each cell, the flutes of said corrugated board forming said spacer running at right angles to the direction of the cells.

4. A structural panel comprising face sheets separated by and adhesively bonded to a core material formed of a plurality of strips formed of corrugated board arranged edgewise between the sheets and of a plurality of spacers formed of corrugated board and bonded to the strips at spaced intervals with intervening areas of said strips separated to form cells, the flutes of the strips running in the direction of the cells and the flutes of said spacers running in a direction at right angles to the direction of the cells to serve as passageways venting each cell for the liberation of gases and vapors from the panel.

5. A method of making a honeycomb material comprising the steps of superimposing alternately upon each other sheets and spacers of corrugated board to form a pad positioning the spacers with the flutes running across the spacers whereby these flutes are adapted to form passageways between the cells, securing said spacers to the sheets along spaced and generally parallel lines with the spacers on one side of each sheet between the spacers on the other side of said sheet, said spacers having passageways extending normal to the said lines, and cutting the pad at right angles across the said lines to form unexpanded slices of the desired thickness, which slices are adapted to be expanded into cellular form with passageways between the cells.

6. The method of claim 5 which comprises forming the sheets of corrugated board and positioning the sheets with the flutes running in the same direction as the spacers.

References Cited in the file of this patent

UNITED STATES PATENTS

| | | |
|---|---|---|
| 2,348,703 | Weir et al. | May 9, 1944 |
| 2,609,068 | Pajak | Sept. 2, 1952 |
| 2,674,295 | Steele et al. | Apr. 6, 1954 |
| 2,700,632 | Ackerlind | Jan. 25, 1955 |